United States Patent Office 3,318,266
Patented May 9, 1967

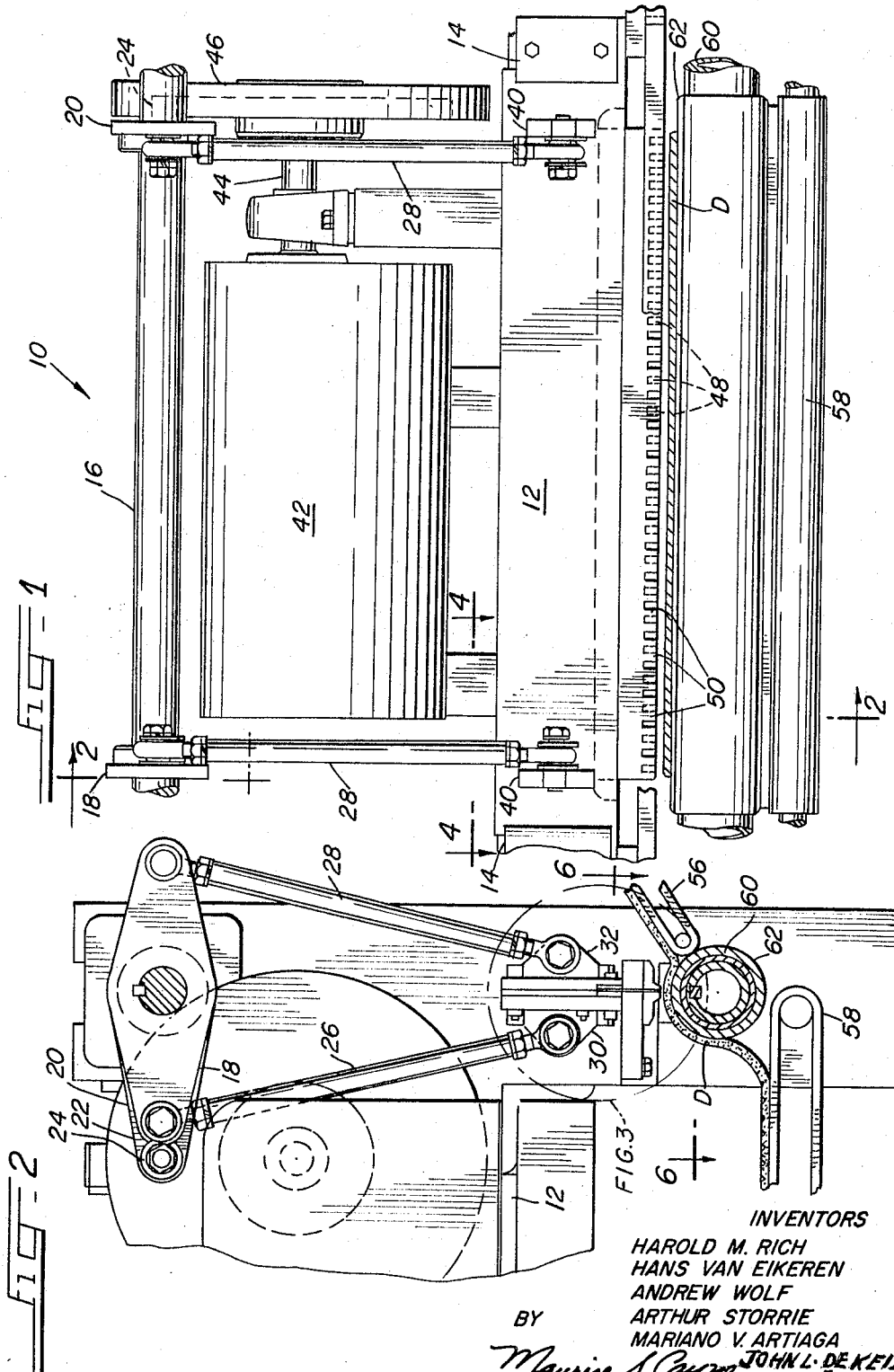

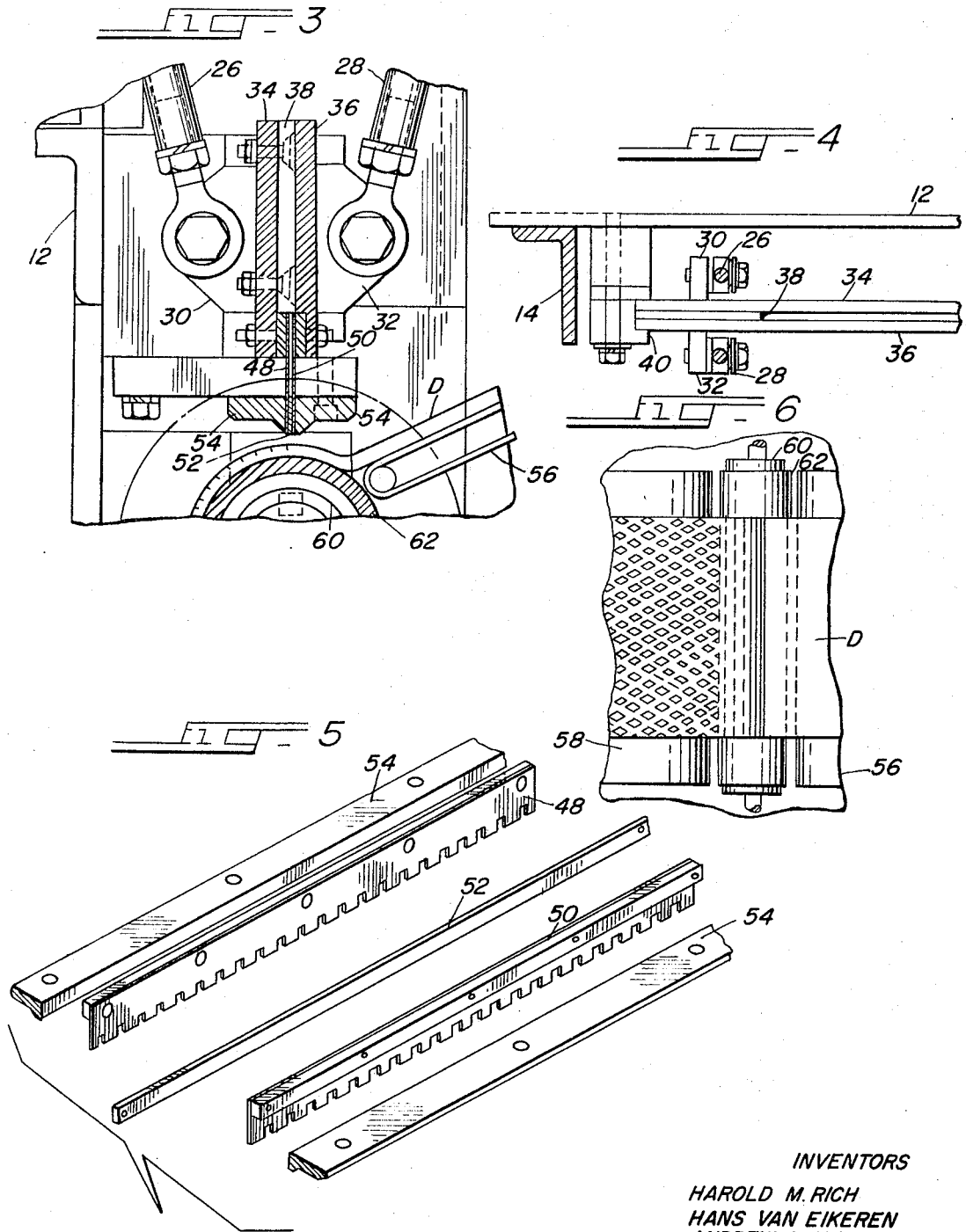

3,318,266
HIGH SPEED CUTTER
Harold M. Rich, Northbrook, Mariano V. Artiaga, Chicago, Andrew Wolf, Deerfield, Hans Van Eikeren, Lincolnwood, John L. De Keizer, Northbrook, and Arthur Storrie, Chicago, Ill., assignors to Kitchens of Sara Lee, Inc., Chicago, Ill., a corporation of Maryland
Filed Feb. 11, 1965, Ser. No. 431,919
11 Claims. (Cl. 107—69)

This invention relates generally to systems and devices for forming a plurality of openings in a continuous sheet of material and more particularly to a high speed device for cutting uniform slits or other openings in a continuous moving sheet of dough or the like. More specifically, the invention relates to improvements in the device and system disclosed in the co-pending application, Ser. No. 409,-660, filed Nov. 9, 1964, and entitled, "Rotary Cutter."

There was disclosed in the aforementioned co-pending application a system for forming uniform and equally spaced diamond shaped openings in a continuous sheet of dough. As will be appreciated by those versed in the art, dough formed with such openings is utilized in various bakery products such as coffee cakes, cobblers, pies, etc. Briefly, the prior invention comprised a freely rotatable rotary cutter having a plurality of radially arranged blades. The cutter was positioned above a conveyor belt so that when a sheet of dough moved thereunder, the same contacted the blades and caused the cutter to rotate. The rotating cutter thereby cut a plurality of uniform slits in the sheet of dough. The sheet of dough then passed onto a second conveyor belt which operated at an increased rate of speed so that the sheet was caused to stretch and form the slits into diamond shaped openings.

Although the invention of the co-pending application represented a notable contribution to the mass production and assembly line baking art, the same nonetheless was characterized by certain undesirable features. Thus, for example, the prior rotary cutter comprised as many as 300 individual blades giving rise to obvious maintenance difficulties. In addition the cutter included a relatively complex stripper structure which provided in effect a stripper for each blade, thereby further increasing the complexity and cost of the cutter. When it was desired to change the pattern of the openings or have the blades cut something other than slits, it was of course necessary to change or replace all 300 individual blades. Moreover, the rotary cutter was positioned directly over the conveyor belt so that this relatively expensive member was subjected to the wear caused by the cutting action of the blades thereagainst.

It is therefore an important object of this invention to provide an improved system and a high speed cutter of the character described which eliminates all of the undesirable features described hereinabove.

Another object of the invention is to afford a cutter which is capable of operating at the required high speeds and yet has a greatly reduced number of blades. A related object is to afford such a high speed cutter having only two blades instead of the approximately 300 heretofore required.

A further object is to provide a high speed cutter of the character described in which the blades may be readily and quickly replaced or changed when it is desired to change the type or pattern of cuts being produced.

Still another object is to afford a high speed cutter of the character described having an extremely simple but most efficient stripper structure to prevent the dough from adhering to the blades.

Yet another object is to provide a high speed cutter of the character described in which the number of parts has been reduced to a minimum thereby reducing maintenance problems to a minimum.

Still a further object is to afford an improved system of the character described in which the blades do not come into contact with the conveyor belt thereby saving this expensive member from the wear caused by such contact.

Yet a further object is to provide an improved high speed cutter of the character described which is relatively inexpensive to build and maintain and yet is most efficient for the purposes intended.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a fragmentary elevational view of a high speed cutter embodying the principles of the invention, with portions broken away, and showing the same in association with certain portions of a system employing the cutter;

FIG. 2 is a fragmentary sectional view taken substantially on the plane of irregular line 2—2 in FIG. 1 and viewed in the direction indicated;

FIG. 3 is an enlarged fragmentary sectional view of the area circumscribed by the broken line circle in FIG. 2;

FIG. 4 is a sectional view taken on the plane of line 4—4 in FIG. 1 and viewed in the direction indicated;

FIG. 5 is an exploded fragmentary perspective view of the cutter blades and associated strippers; and FIG. 6 is a fragmentary top plan view taken substantially on the plane of irregular line 6—6 in FIG. 2 and viewed in the direction indicated.

Referring more particularly to the various figures of the drawings, it will be seen that the reference numeral 10 indicates generally a high speed cutter embodying the principles of the invention. The cutter 10 comprises a supporting framework which may include suitable structural members such as 12 and 14. Rotatably journaled in the supporting framework is a shaft 16, and a pair of lever arms 18 and 20 is rigidly mounted on said shaft adjacent opposite ends thereof.

As indicated in FIG. 2 of the drawings, the lever arms 18 and 20 are substantially ovate in configuration and are mounted in aligned relationship on the shaft 16. It will be noted however, that the lever arm 20 includes a segment 22 extending from one end thereof. Mounted on the segment 22 is a cam follower 24 whose function will become apparent as the description proceeds.

Connecting rods 26 and 28 are pivotally connected to the inner surfaces of the lever arms 18 and 20 and adjacent the opposite ends of said arms as indicated. Pivotally connected to the bottom ends of the connecting rods 26 and 28 is a pair of opposed ears 30 and 32 respectively. A pair of elongated slide plates 34 and 36 is carried by the pairs of ears 30 and 32 so that said plates are in opposed face-to-face relationship. Secured to one of the slide plates such as 34 is one or more wear strips 38 (see FIGS. 3 and 4). The wear strips 38 may be made of a relatively frictionless material, such as "nylon," or the like, and it will be appreciated that said strips function as a spacer to limit the distance between the opposing slide plates 34 and 36.

A pair of vertical gibs such as 40 is mounted on the supporting framework, and the free ends of the slide plates 34 and 36 are slidably positioned therein as indicated in FIG. 4. The gibs 40 may likewise be made of a relatively frictionless material such as "nylon," and it will thus be appreciated that the slide plates 34 and 36 are adapted to reciprocate vertically in the gibs. In order to reciprocate the slide plates as indicated, suitable drive means such as a motor 42, a drive shaft 44 and a cam 46 are provided. The cam 46 cooperates with the cam follower 24 to impart a rocking motion to the shaft 16 and lever arms 18 and 20 so that the slide plates 34 and 36 reciprocate alternately, or in opposite directions.

Secured to the slide plates 34 and 36 and projecting downwardly therefrom is a pair of elongated cutting blades 48 and 50. In the embodiment illustrated, the blades 48 and 50 have similar and substantially saw toothlike cutting edges. It is important to note, however, as illustrated in FIGS. 2 and 5, that the teeth of the blades 48 and 50 are unaligned or staggered. Thus, the reciprocating cutting action of the blades 48 and 50 will produce a pattern of staggered slits in a manner which will subsequently be more fully described.

Cooperating with the blades 48 and 50 are an inner stripper 52 and a pair of outer strippers 54, 54. The strippers 52 and 54 are mounted in immovable relationship on a suitable bracket (not shown) so that the inner stripper 52 functions to strip dough or the like from the inner surfaces of the blades while the outer strippers 54 function to strip the dough from the outer surfaces of the blades as said blades move from the lowered cutting position to the upraised position.

In a manner similar to that described in the aforementioned co-pending application, the high speed cutter 10 is employed in a system which includes a first conveyor belt 56 and a second conveyor belt 58 which operates at increased rate of speed and is positioned slightly therebelow (see FIG. 2). It is important to note, however, that a separate and independently rotatable roller 60 is positioned between the adjacent ends of the conveyors 56 and 58. The roller 60 is positioned with its longitudinal axis in alignment with the blades 48 and 50, and the same includes a durable and cut resistant coating 62 which is capable of withstanding the cutting shock of the blades thereon.

In operation, a continuous sheet of dough D is carried by the conveyor 56 at a first rate of speed. When the sheet of dough reaches the end of the conveyor 56 it is immediately moved in the same direction and at substantially the same rate of linear speed by the independently driven roller 60. Simultaneously, the cutter blades 48 and 50 are reciprocated as previously described so that the cutting edges cut into the sheet of dough and make contact with the roller 60. As indicated in FIG. 6 of the drawings, the action of the blades results in a pattern of staggered short slits comparable to the teeth of the blades. When the sheet of dough D now leaves the roller 60, it falls by gravity onto the faster moving second conveyor 58. As a result of the stretching of the sheet of dough caused by the falling and increased rate of travel, the slits are expanded and changed into the desired diamond pattern.

From the foregoing description and drawings, it should be apparent without further description that we have provided a novel and improved high speed cutter and system for cutting slits in a continuous moving sheet of dough or the like. In this respect, it will be appreciated that cutting blades having different cutting edges may be employed to achieve other desired patterns of cuts and openings in the dough. The improved cutter uses only two blades so that changes in the cut pattern may be readily and quickly accomplished. The cutting shock of the blades is received by an extremely durable independent roller thereby eliminating wear and frequent replacement of expensive conveyor belts as was heretofore necessary. Thus, maintenance costs and down time have been reduced to minimum despite the fact that the two blades are capable of operating at equally high speeds of approximately 300–350 cycles, or 600–700 blade cuts, per minute.

Those skilled in the art will of course appreciate that the spacing between the transverse rows of slits is a function of the linear speed of the moving sheet of dough D, the rotational speed of the cam 46, and the angular distance between the cam actuating surfaces. Thus, the spacing between the rows of slits may be changed or varied from the uniform spacing shown, simply by adjusting one or more of the described variables. In addition, plain and unbroken blades may be employed instead of the serrated blades 48 and 50, in which event the cutter 10 will function as an ordinary cutter for actually severing individual segments from the sheets of dough D.

It is believed that our invention, its mode of construction and assembly, and many of its advantages should be readily understood from the foregoing without further description, and it should also be manifest that while a preferred embodiment of the invention has been shown and described for illustrative purposes, the structural details are nonetheless capable of wide variation within the purview of our invention as defined in the appended claims.

What we claim and desire to secure by Letters Patent of the United States is:

1. A high speed cutter comprising
a pair of elongated blades,
means retaining said blades in parallel horizontally spaced relationship,
linkage means connected to said blades for simultaneously reciprocating said blades in opposite directions, and
drive means connected to said linkage means.

2. The cutter of claim 1 in which said blades comprise
a cutting edge having a plurality of longitudinally spaced teeth,
the teeth of one of said blades being misaligned with the teeth of the other of said blades whereby said cutter creates a pattern of staggered relatively short cuts in an object moving therepast and cut thereby.

3. The cutter of claim 1 in which said first mentioned means comprises
a pair of gibs accommodating the opposite ends of said blades therein, and
a spacer member secured to one of said blades and positioned between said pair of blades.

4. The cutter of claim 3 in which said linkage means comprises a shaft,
a pair of lever arms rigidly mounted on said shaft,
a pair of connecting rods pivotally connected at one end to each of said levers arms, and
a pair of slide plates pivotally connected to the opposite ends of said connecting rods in opposed relationship,
said blades being secured to said slide plates.

5. The cutter of claim 4 in which said drive means comprises
a cam follower connected to one of said lever arms, and
a motor driven cam,
said cam cooperating with said cam follower to impart a rocking motion to said lever arms and shaft.

6. A high speed cutter for a moving continuous sheet of dough or the like comprising
a pair of elongated spaced parallel blades positioned above said sheet and normal to the path of travel thereof, a pair of gibs accommodating the opposite ends of said blades for reciprocal movement therein, a spacer member secured to one of said blades for maintaining the spacing between said blades, linkage means connected to said blades for simultaneously reciprocating said blades in opposite directions, drive means connected to said linkage means, and strippers associated with said blades to strip said sheet therefrom as said blades move upwardly after contacting said sheet.

7. The cutter of claim 6 in which said strippers comprise a thin elongated member immovably positioned between, and a pair of elongated members immovably positioned one adjacent the outer surface of each of said blades, said strippers being of a length at least co-extensive with said blades.

8. The cutter of claim 7 in which each of said blades comprises a cutting edge having a plurality of teeth spaced longitudinally along the length thereof, the teeth of one of said blades being misaligned with the teeth of the other of said blades whereby said cutter acts upon said sheet passing thereunder to form a pattern of staggered relatively short slits therein.

9. The cutter of claim 8 in which said linkage means comprises a shaft, a pair of generally ovate lever arms rigidly mounted on said shaft and in spaced relationship one with the other, a pair of connecting rods pivotally connected at one end to the opposite ends of each of said lever arms, and a pair of slide plates connected in opposed relationship to the opposite ends of said connecting rods, said blades being secured to said slide plates, and said drive means comprises a cam follower connected to one of said lever arms, and a motor driven cam, said cam cooperating with said cam follower to impart a rocking motion to said lever arms and shaft.

10. Apparatus for forming a pattern of openings in a continuous sheet of dough or the like comprising a first conveyor belt, an independently driven roller adjacent the terminus of said first conveyor belt, a second conveyor belt adjacent and beneath said roller, and a high speed cutter positioned above said roller and adapted to cut a pattern of staggered slits in said sheet as the same passes therebeneath, said second conveyor belt operating at a rate of travel in excess of the rate of travel of said first conveyor belt whereby said sheet is caused to stretch and form said openings.

11. The apparatus of claim 10 in which said high speed cutter comprises a pair of elongated spaced parallel blades positioned above said roller and in alignment with the longitudinal axis thereof, means retaining said blades in spaced parallel relationship, linkage means connected to said blades for simultaneously vertically reciprocating said blades in opposite directions, and drive means connected to said linkage means, each of said blades including a cutting edge having a plurality of teeth spaced longitudinally along the length thereof, the teeth of one of said blades being misaligned with the teeth of the other of said blades.

References Cited by the Examiner
UNITED STATES PATENTS

| | | | |
|---|---|---|---|
| 2,294,478 | 9/1942 | Norris et al. | 29—6.2 |
| 2,562,678 | 7/1951 | Okumura | 83—618 |
| 2,611,298 | 9/1952 | Rowe | 29—6.2 X |

WALTER A. SCHEEL, *Primary Examiner.*

J. SHEA, *Assistant Examiner.*